No. 783,041. Patented February 21, 1905.

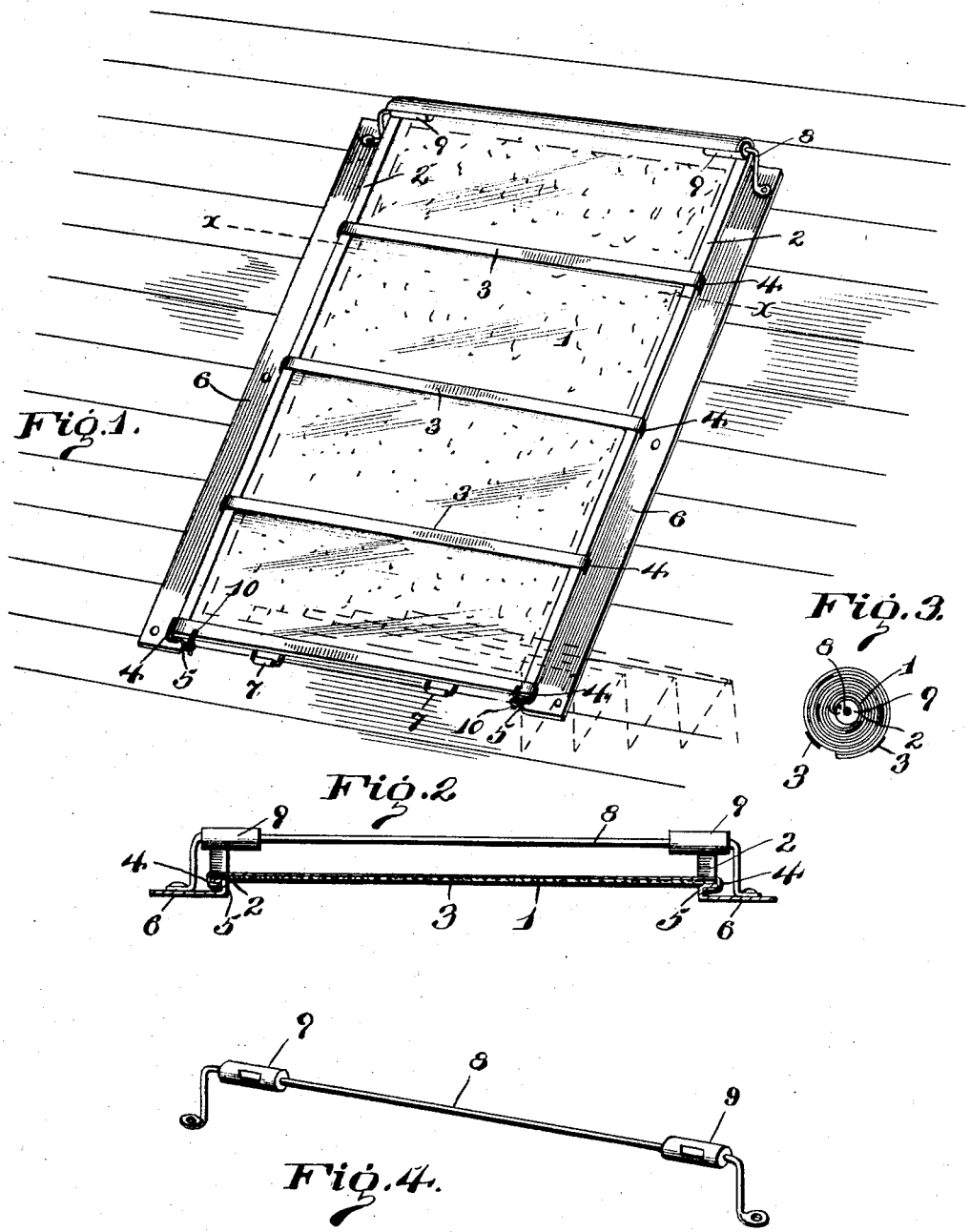

UNITED STATES PATENT OFFICE.

MARY E. HULTQUIST, OF BROOKHAVEN, MISSISSIPPI.

FIREPROOF STAIR-SHUTTER.

SPECIFICATION forming part of Letters Patent No. 783,041, dated February 21, 1905.

Application filed October 18, 1904. Serial No. 228,973.

*To all whom it may concern:*

Be it known that I, MARY E. HULTQUIST, a citizen of the United States, residing at Brookhaven, in the county of Lincoln and State of Mississippi, have invented certain new and useful Improvements in Fireproof Stair-Shutters, of which the following is a specification.

It is well known that stairways in dwellings and buildings frequently cause a rapid spread of flames in the event of fire both by creating a draft and affording an unobstructed passage for the consuming elements.

This invention has for its object to limit the fire and prevent its rapid passage from between floors, this being effected by means of a shutter or fender for the stairway or other opening by means of which access is had from one floor to the other.

This invention provides a shutter or fender of fireproof material, such as asbestos or metal or a combination of such or other fire-resisting material, said shutter having spring-strips attached thereto to automatically roll and keep same wound when not held open or extended by securing means.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view showing the invention applied to a stairway, the shutter being extended. Fig. 2 is a transverse section on the line $x$ $x$ of Fig. 1. Fig. 3 is an end view of the shutter-roll. Fig. 4 is a perspective view of the rod and sleeves upon which the shutter rolls or winds.

Corresponding and like parts are referred to in the following description and indicated in all the views of the drawings by the same reference characters.

The shutter or fender 1 is of a size to completely and effectually close the opening in the floor at the head of the stairway and is flexible, so as to roll, and is composed of any fireproof material, such as asbestos or metal or a combination thereof. Spring-metal strips 2 are attached to the shutter or fender for the dual purpose of strengthening the same and to cause the shutter to automatically roll or wind. The spring-strips 2 are provided in spiral form and are unwound when the shutter is extended across the opening or stairway to be protected. The strips 2 are provided at opposite ends with hooks or other attaching means for securing the shutter when extended to the part about which it rolls or winds. Transverse bars or strips 3 are attached to the shutter at intervals in its length and serve to strengthen and brace the same, as well as to provide means for securing the shutter at its edges to guides arranged at the sides of the floor-opening leading to the stairway. The end portions of the bars 3 are preferably formed with hooks 4 to engage the curved edge portions 5 of plates 6, secured at opposite sides of said floor-opening and constituting the guides for holding the shutter or fender close to the floor and preventing escape of flame. Handles 7 are applied to the free end of the shutter to be grasped when it is required to extend the same across the floor-opening.

At one end of the floor-opening is located a rod 8, the end portions of which are bent and apertured to receive fastenings. The shutter rolls or winds about said rod and is preferably attached to short sleeves 9, loosely mounted upon opposite end portions of the rod and having openings in their sides for reception of the hooks at the attaching ends of the spring-strips 2. The rod 8 is stationary, and the sleeve 9 revolves freely thereon when extending the shutter or the same is rolling.

The plates 6 may be of any construction and are secured in any convenient and substantial manner to the casement surrounding the floor-opening through which passage is had to and from the stairway. The inner longitudinal edge portion of each of the plates 6 is inturned, as shown at 5, for the hooks 4 to engage and hold the shutter close to the floor when extended and prevent draft displacing the same. When the shutter is extended, it is held open by engaging the hooked ends of the spring-strips 2 with staples 10 or other form of fastening at the end of the floor-opening opposite to that adjacent to the rod 8.

While the shutter is intended most especially for stairways, it is to be understood that it may be applied to floor-openings or other places to be protected against the spread of fire, the parts being relatively disposed substantially in the manner as herein specified.

Having thus described the invention, what is claimed as new is—

1. A flexible shutter having a spring-metal strip attached thereto and rolled upon itself and serving to automatically roll or wind the shutter, substantially as specified.

2. In combination, guides at opposite sides of an opening, a flexible shutter, and reinforcing bars or strips attached to the shutter and having their end portions bent to provide hooks for engaging the aforesaid guides to retain the shutter in desired position when extended, substantially as specified.

3. In combination, a flexible shutter, and strips of spring metal rolled upon themselves and connected thereto and provided at their ends with attaching means for securing the ends of the shutter when extended, substantially as set forth.

4. In combination, a stationary rod, a sleeve loosely mounted upon said rod, and a self-winding shutter attached to said sleeve and adapted to revolve therewith about said stationary rod when rolling upon itself, substantially as specified.

In testimony whereof I affix my signature in presence of two witnesses.

MARY E. HULTQUIST. [L. S.]

Witnesses:
R. C. APPLEWHITE,
A. HURST.